US010354853B2

(12) United States Patent
Nakano

(10) Patent No.: US 10,354,853 B2
(45) Date of Patent: Jul. 16, 2019

(54) ICP MASS SPECTROMETER

(71) Applicant: SHIMADZU CORPORATION, Kyoto-shi, Kyoto (JP)

(72) Inventor: Tomohito Nakano, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/065,496

(22) PCT Filed: Jun. 24, 2016

(86) PCT No.: PCT/JP2016/068762
§ 371 (c)(1),
(2) Date: Jun. 22, 2018

(87) PCT Pub. No.: WO2017/110118
PCT Pub. Date: Jun. 29, 2017

(65) Prior Publication Data

US 2019/0013192 A1 Jan. 10, 2019

(30) Foreign Application Priority Data

Dec. 24, 2015 (JP) ................................ 2015-251434

(51) Int. Cl.
*G01N 27/62* (2006.01)
*H01J 49/04* (2006.01)
*H01J 49/10* (2006.01)

(52) U.S. Cl.
CPC .......... *H01J 49/0422* (2013.01); *G01N 27/62* (2013.01); *H01J 49/0468* (2013.01); *H01J 49/10* (2013.01); *H01J 49/105* (2013.01)

(58) Field of Classification Search
None
See application file for complete search history.

(56) References Cited

U.S. PATENT DOCUMENTS 5,741,710 A * 4/1998 Ek ............................ G01N 1/28
417/442
6,239,038 B1 * 5/2001 Wen .................. H01L 21/67023
438/745

(Continued)

FOREIGN PATENT DOCUMENTS

JP 2014-085268 A 5/2014
JP 2014085268 A * 5/2014 ............... H05H 1/30

OTHER PUBLICATIONS

International Search Report for PCT/JP2016/068762 dated Aug. 16, 2016.

*Primary Examiner* — Andrew Smyth
(74) *Attorney, Agent, or Firm* — Sughrue Mion, PLLC

(57) ABSTRACT

Provided is an ICP mass spectrometer which is able to effectively discharge residual water by limiting the consumption of Ar gas and a fluctuation in supply pressure of an Ar gas source at the time of an Ar gas purge for a coolant system. The ICP mass spectrometer is provided with: a device body part 1; a coolant system 2 that supplies a coolant from a water source 20 to to-be-cooled structure parts including a high-frequency power supply 12, a high-frequency coil 18, and a sample introduction part 13, which need to be cooled; and an Ar gas supply system 3. Intermediate valves V2, V3 are disposed on the downstream side of a main valve V0, a purge gas channel 32 having a purge valve V1, and a meeting point G of the purge gas channel 32. The to-be-cooled structure parts are connected to a cooling-use pipe on the downstream side of the intermediate valves V2, V3. A valve control part 35 is configured to perform intermittent purge control of repeating accumulation and discharge of the Ar gas on the upstream side of the intermediate valves V2, V3 by intermediately opening and closing the intermediate valves V2, V3 when the Ar gas is being sent.

4 Claims, 7 Drawing Sheets

(56) References Cited

U.S. PATENT DOCUMENTS

| | | | | |
|---|---|---|---|---|
| 7,518,108 | B2 * | 4/2009 | Frey .................... | H01J 49/0045 250/281 |
| 2005/0109374 | A1 * | 5/2005 | Letessier ................... | B08B 9/00 134/22.1 |
| 2006/0285108 | A1 * | 12/2006 | Morrisroe ............. | F23C 99/003 356/316 |

* cited by examiner (FIG. 1)
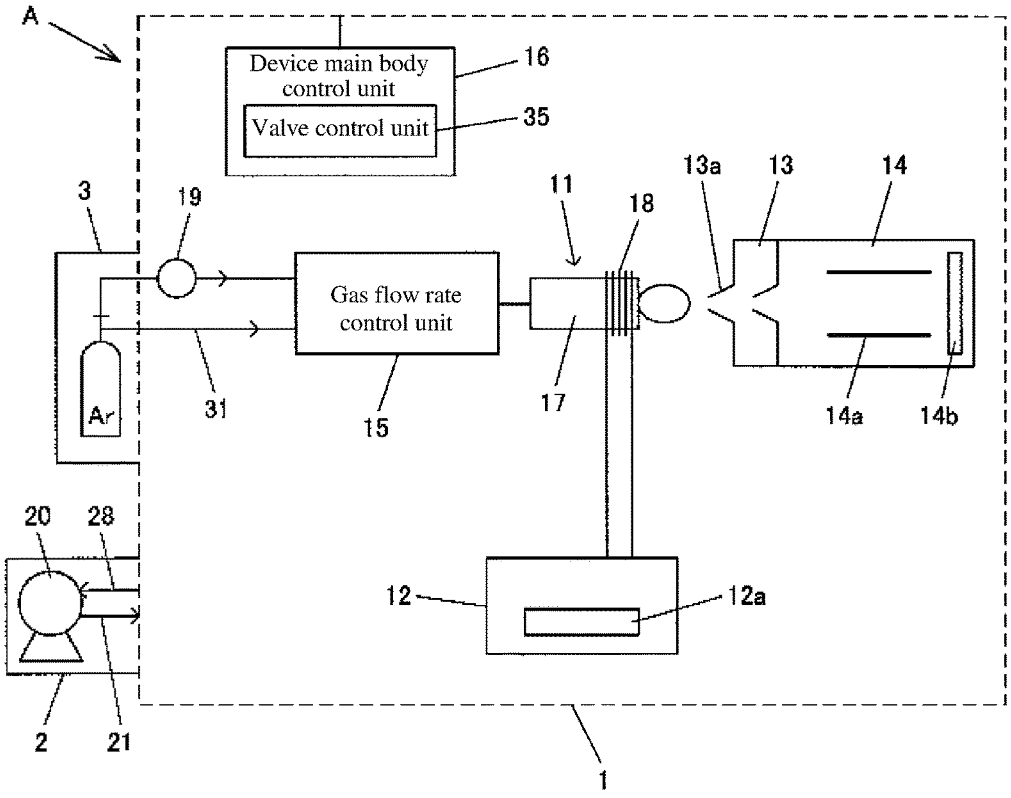

(FIG. 2)
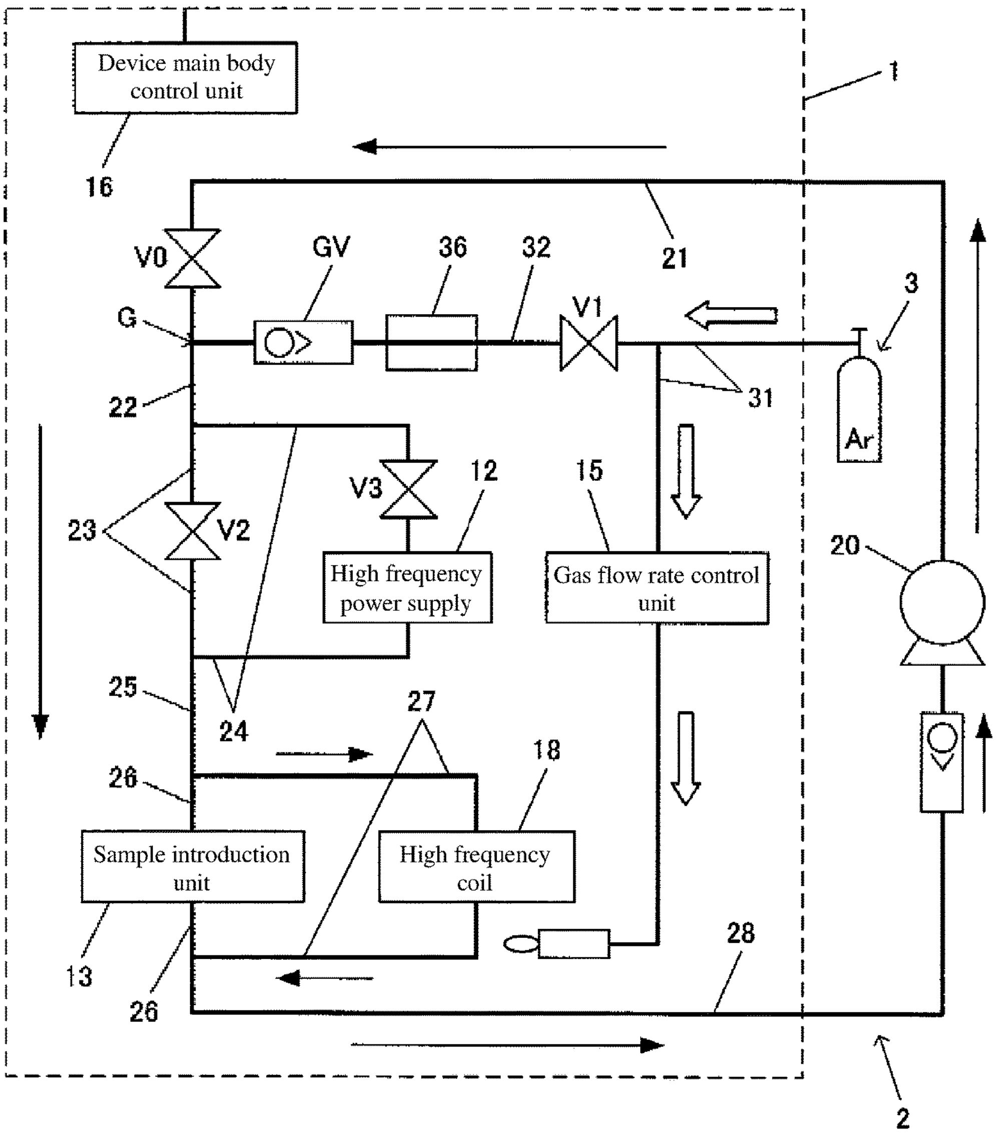

(FIG. 3)
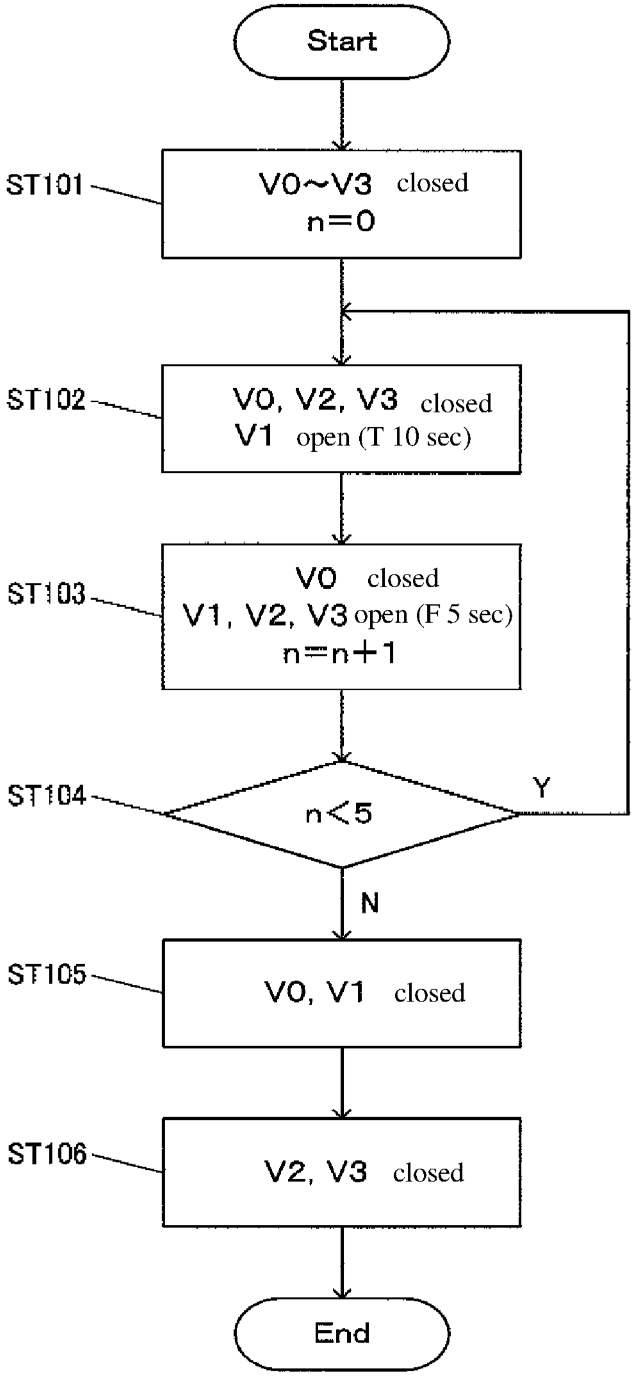

(FIG. 4)
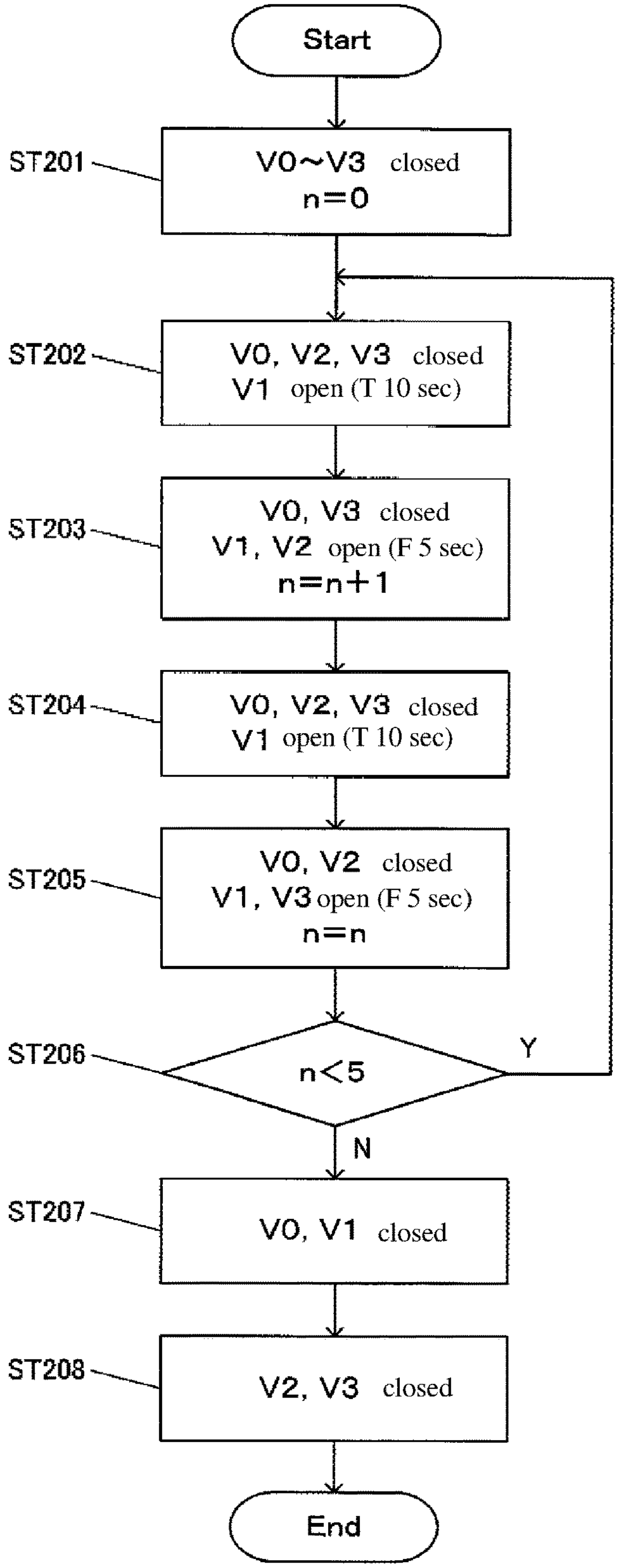

(FIG. 5)
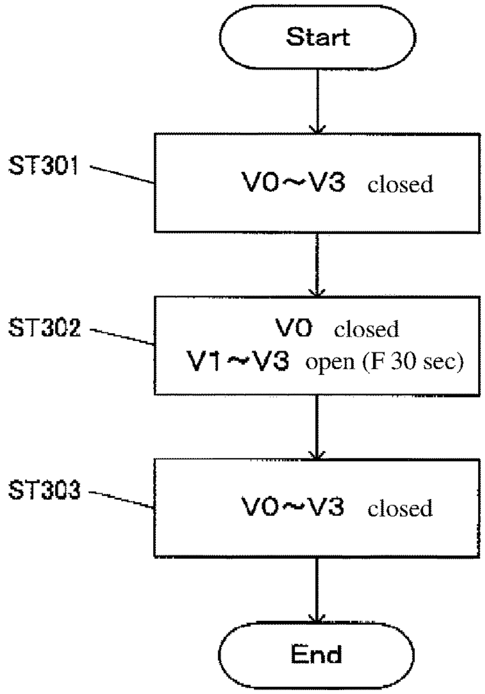
(FIG. 6)
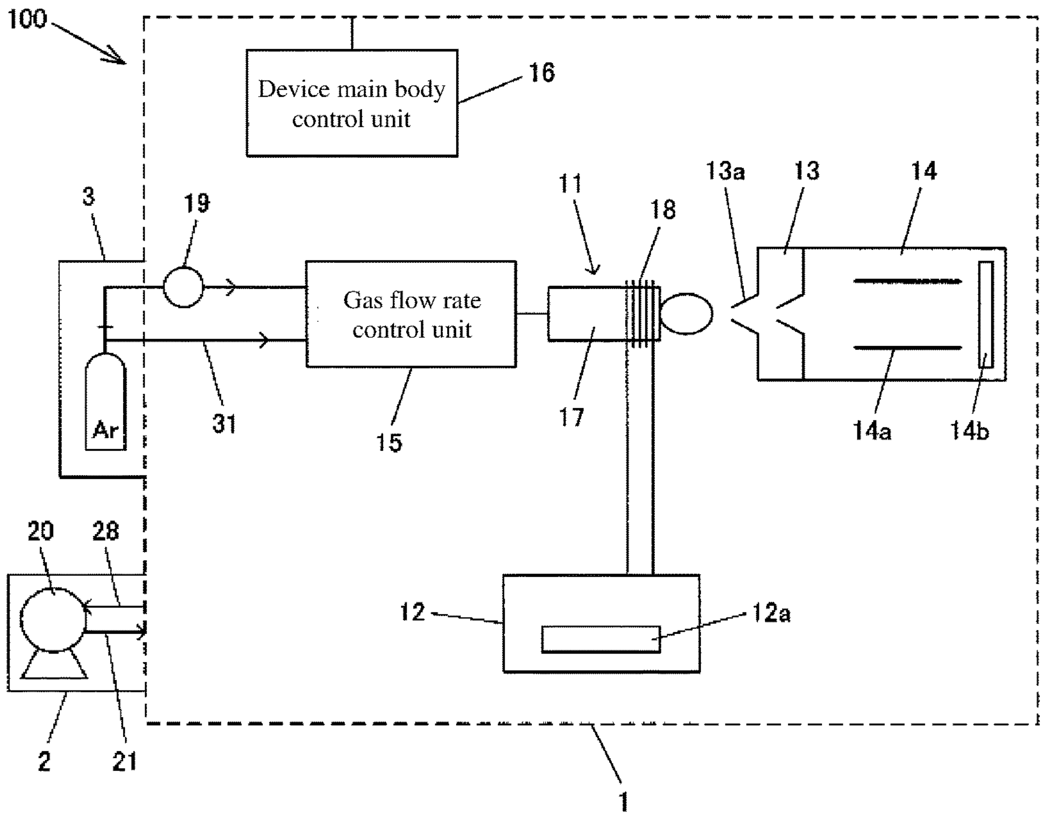

(FIG. 7)
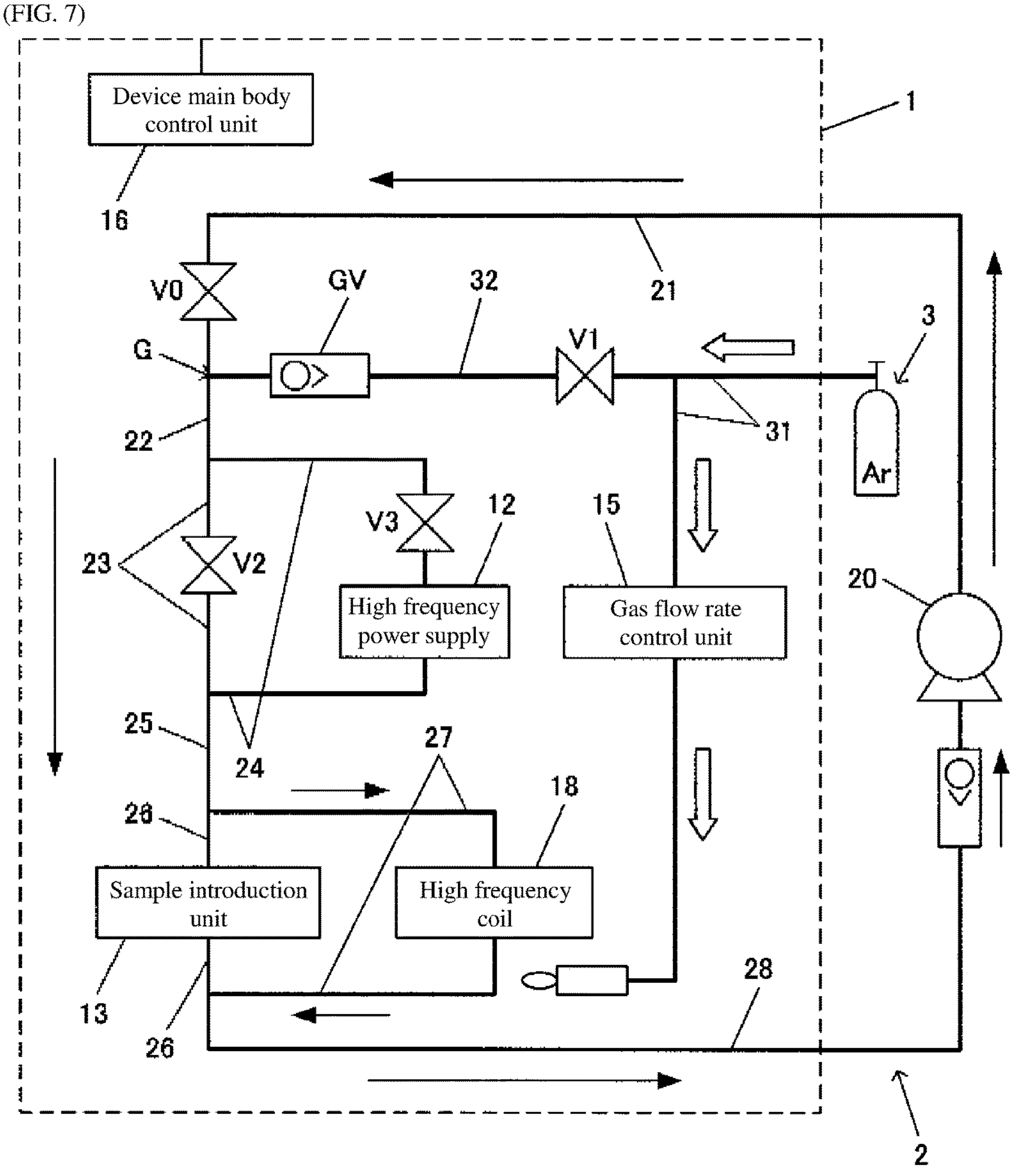

(FIG. 8)
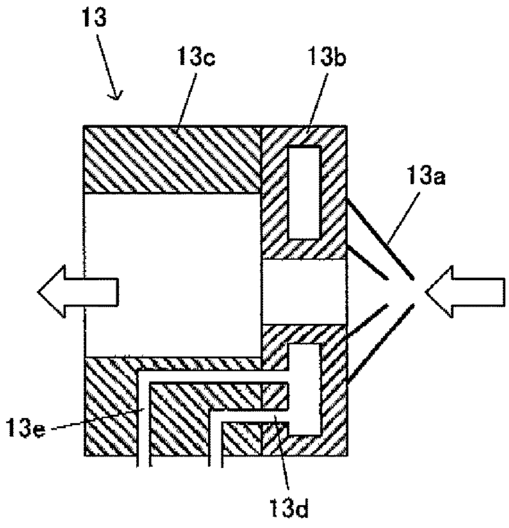
(FIG. 9)
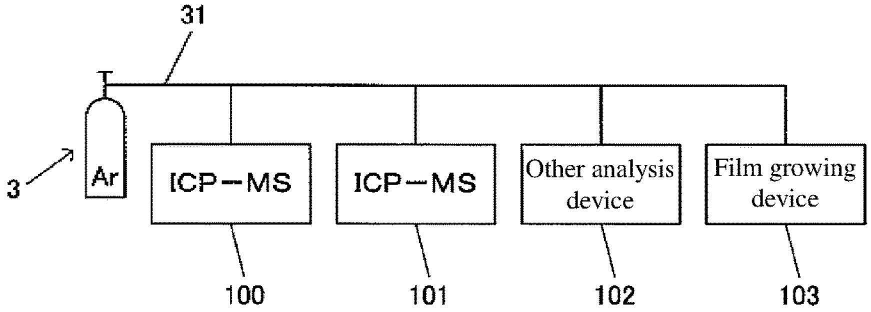

ICP MASS SPECTROMETER

CROSS REFERENCE TO RELATED APPLICATIONS

This application is a National Stage of International Application No. PCT/JP2016/068762 filed Jun. 24, 2016, claiming priority based on Japanese Patent Application No. 2015-251434 filed Dec. 24, 2015.

TECHNICAL FIELD

The present invention relates to an ICP mass analysis device (also known as ICP-MS) which performs mass analysis by ionizing a sample by means high frequency inductively coupled plasma.

BACKGROUND ART

ICP mass analysis devices are widely known as analyzers capable of performing high sensitivity multi-element analysis, and are used for elemental analysis in a broad range of fields (for example, see Patent Literature 1). FIG. 6 illustrates the general device configuration of an ICP mass analysis device.

ICP mass analysis device 100 mainly comprises a plasma torch 11, a high frequency power supply 12, a sample introduction unit 13, a mass analysis unit 14 comprising a mass analyzer, a gas flow rate control unit 15, and a device main body control unit 16, which make up a device main body unit 1. A cooling water system 2 and an Ar gas supply system 3, which are necessary when using the ICP mass analysis device 100, are furthermore connected to the device main body unit 1.

The device main body unit 1 of the ICP mass analysis device 100 will be described in detail. The gas flow rate control unit 15 performs flow rate control of sample gas supplied from a nebulizer 19, Ar gas for plasma generation supplied via gas pipe 31 from the Ar gas supply system 3, and the like. The plasma torch 11 comprises a multiwall cylindrical reaction tube 17 to which plasma gas (Ar gas) and sample gas are supplied under flow rate control by the gas flow rate control unit 15, and a high frequency coil 18 wound onto the outer circumference of the reaction tube 17.

The high frequency power supply 12 is connected to a high frequency coil 18, and plasma is generated to ionize the sample gas by applying high frequency voltage to the high frequency coil 18 in a state where plasma gas and sample gas have been introduced into the plasma torch 11.

The sample introduction unit 13 is kept in a reduced pressure state by means of a vacuum pump (not illustrated) and is designed to draw in ions of the sample, which has been ionized by the plasma torch 11, along the central axis of a sampling cone 13*a* through a sample introduction orifice. The mass analysis unit 14 is maintained at a higher vacuum than the sample introduction unit 13, and performs mass separation of the sample ions, which have been draw in from the sample introduction unit 13, by means of a quadrupole 14*a* or the like, and further performs mass analysis by means of an ion detector 14*b*.

The device main body control unit 16 is composed of a computer device comprising an input device (keyboard, mouse, etc.), display device (liquid crystal panel, etc.) and input/output interface, and performs configuration, command input and control of the various units of device main body unit 1, and also performs processing of data detected by the ion detector 14*b*.

In this sort of ICP mass analysis device 100, the reaction tube 17 of the plasma torch 11 which generates plasma is brought to a high temperature through induction heating, and in addition to that, the sample introduction unit 13 located opposite the plasma torch 11, the high frequency coil 18 and the high frequency power supply board 12*a* contained within the high frequency power supply 12 also reach a high temperature.

Thus, excluding the reaction tube 17 of the plasma torch 11, cooling is required for the sample introduction unit 13, high frequency coil 18 and high frequency power supply 12, and cooling water is supplied from a cooling water system 2 in order to prevent corrosion and melting of the copper sampling cone 13*a* of the sample introduction unit 13 and of the copper high frequency coil 18, and to prevent breakdown due to heat generation of the high frequency power supply board 12*a* contained within the high frequency power supply 12.

FIG. 7 is a drawing illustrating the piping system of cooling water system 2 and Ar gas supply system 3. The water-cooling piping of the cooling water system 2 is connected from a chiller (water source) 20 having a circulation pump which feeds cooling water, via a flow passage 21 to a master valve V0. The downstream side of the master valve V0 is connected to a flow passage 22, and the flow passage 22 branches in two and is connected to a first intermediate valve V2 and a second intermediate valve V3. A flow passage (bypass flow passage) 23 leading to the high frequency power supply 12 is connected to the first intermediate valve V2. A flow passage (high frequency power supply cooling flow passage) 24 for cooling the high frequency power supply 12 (high frequency power supply board 12*a*) is connected to the second intermediate valve V3.

Flow passage (bypass flow passage) 23 and flow passage (high frequency power supply cooling flow passage) 24 are used by switching between them so as to prevent condensation from forming on the high frequency power supply 12, and are controlled such that the flow passage 24 side is opened when the high frequency power supply is in an ON state and requires cooling, and the flow passage 23 side is opened when the high frequency power supply is in an OFF state and does not require cooling. This flow passage switching control is performed by the device main body control unit 16 in a manner interlocked with the turning on and off of the high frequency power supply 12, with control being performed such that when one is opened, the other is closed, so that cooling water is always flowing.

Flow passage 23 and flow passage 24 merge into flow passage 25, which then again branches into two and is connected to a flow passage (sample introduction unit cooling flow passage) 26 which cools the sample introduction unit 13 and a flow passage (high frequency coil cooling flow passage) 27 which cools the high frequency coil 18. After cooling the sample introduction unit 13 and high frequency coil 18, the flow passage 26 and flow passage 27 merge again into flow passage 28, and flow passage 28 is recirculated to the chiller 20.

The portions of device main body unit 1 which require cooling by the cooling water system 2 will be referred to as "cooled structures." Among the three cooled structures consisting of the high frequency power supply 12, sample introduction unit 13 and high frequency coil 18, in the sampling cone 13*a* of the sample introduction unit 13, the orifice diameter of the central sample introduction orifice gradually widens due to aging degradation, which has an effect on analysis results, so the sampling cone 13*a* is made replaceable as a consumable part.

FIG. 8 is a simplified cross-sectional view illustrating the sample introduction unit 13. The sampling cone 13*a* is integrally mounted on the outer surface side of cooling jacket 13*b*, and the inner surface side of the cooling jacket 13*b* is removably secured across a seal (not illustrated) so as to make the interface with the sample introduction unit main body 13*c* liquid-tight. A cooling flow passage 13*d* through which cooling water flows is formed in the cooling jacket 13*b*, and cooling water is supplied via a connecting flow passage 13*e* provided in the sample introduction unit main body 13*c*.

When the sampling cone 13*a* is to be replaced, the replacement is made from the cooling jacket 13*b*, and thus when the cooling jacket 13*b* is detached from the sample introduction unit main body 13*c*, the cooling water flow passage is opened at the interface between the connecting flow passage 13*e* and cooling flow passage 13*d*.

If the cooling jacket 13*b* is to be detached in order to replace the sampling cone 13*a* after cooling water has been fed into the cooling water system 2, it is necessary to stop the supply of water by closing the master valve V0, and to perform purging in order to drain the residual water remaining in the various flow passages past the master valve V0. For this purpose, a flow passage for supplying purge gas is formed in the cooling water system 2.

Namely, as shown in FIG. 7, a purge gas flow passage 32 is formed, which branches off from the middle of the Ar gas flow passage 31 of the Ar gas supply system 3 and is connected at merging point G to the flow passage 22 downstream of the master valve V0 of the cooling water system 2. A purge valve V1 is provided in the purge gas flow passage 32, and a check valve GV which prevents cooling water backflow is interposed.

When the cooling jacket 13*b* of the sample introduction unit 13 is to be replaced, first, the master valve V0 is closed, after which the purge valve V1, first intermediate valve V2 and second intermediate valve V3 are all opened simultaneously, residual water is drained by introducing Ar gas from purge gas flow passage 32 into flow passages 22 through 28, and then the cooling jacket 13*b* is removed.

Similar Ar gas purging is also performed when performing maintenance operations of the cooling water system 2 besides the sample introduction unit 13. Furthermore, a similar draining operation using Ar gas purging is performed not just during maintenance operations but also in order to prevent corrosion due to residual water when the device is stopped for a long period of time.

PRIOR ART DOCUMENTS

Patent Literatures

Patent Literature 1: Japanese Unexamined Patent Application Publication 2014-85268

SUMMARY OF THE INVENTION

Problem to be Solved by the Invention

However, the water cooling piping of the cooling water system 2 has a large pipe diameter and relatively low pipe resistance, so if purging with Ar gas is continued in order to drain the residual water, the amount of Ar gas consumption will become extremely high.

Furthermore, the same Ar gas that is used for purging the cooling water system 2 is also used in the ICP mass analysis device 100 as the plasma gas (Ar gas), as the carrier gas for nebulizing the sample, etc., and is supplied via the Ar gas supply system 3 from an Ar gas source consisting of a single gas bottle (or liquid bottle).

At sites such as research facilities or factories where ICP mass analysis devices are installed, the Ar gas source is in nearly all cases used not just for a single ICP mass analysis device but is rather shared among multiple devices (other analytical devices, film growing devices, etc.).

For example, as shown in FIG. 9, the Ar gas source of the Ar gas supply system 3 may be set up to supply Ar gas via an Ar gas flow passage 31 not just to the ICP mass analysis device (ICP-MS) 100 but also to a second ICP-MS 101, another analytical device 102, film forming device 103, etc.

In such an environment, when Ar gas purging is performed on the cooling water system 2 of the ICP mass analysis device 100 as described above, Ar gas will continuously flow into the water cooling piping at a larger flow rate compared to when Ar gas is supplied from the Ar gas flow passage 31 to the gas flow rate control unit 15, and so the supply pressure of the Ar gas source will gradually decrease. Specifically, it has been confirmed that Ar gas supply pressure which is normally maintained by means of a regulator at 480 KPa may drop to 400 KPa or less.

Therefore, there is an adverse effect upon the operation of other devices to which Ar gas is supplied from the same Ar gas source. In an environment where two ICP-MS devices 100 and 101 are connected to a common Ar gas source as shown in FIG. 9, if Ar gas is supplied to the cooling water system 2 for maintenance operations on the first ICP-MS 100 while analysis is performed simultaneously on the second ICP-MS 101, there is the concern that proper gas flow rate control will become impossible due to the reduction in Ar gas supply pressure, and problems such as the plasma being extinguished may arise.

It is therefore an object of the present invention to provide an ICP mass analysis device which makes it possible to reduce the Ar gas consumption rate when performing Ar gas purging of the cooling water system of the ICP mass analysis device, while allowing residual water to be effectively drained.

It is a further object of the present invention to provide an ICP mass analysis device capable to reducing fluctuation in the supply pressure of the Ar gas source when Ar gas purging of the cooling water system is performed.

Means for Solving the Problem

The ICP mass analysis device of the present invention, made to resolve the aforementioned problem, comprises: a device main body unit which supplies Ar gas for plasma generation and sample gas, via a gas flow rate control unit which controls gas flow rate, to a reaction tube of a plasma torch, ionizes the sample gas by applying a high frequency voltage from a high frequency power supply to a high frequency coil of said plasma torch, and draws in generated sample ions through a sample introduction unit to a mass analyzer to perform mass analysis; a cooling water system in which water cooling piping is connected as a flow passage to cooled structures which require cooling, including said high frequency power supply, said high frequency coil and said sample introduction unit, and which supplies cooling water from a water source to said cooled structures; and an Ar gas supply system in which gas piping is connected as a flow passage to said gas flow rate control unit and which supplies Ar gas from an Ar gas source; wherein, in said cooling water system, there is provided a master valve (V0) which is connected as a flow passage on the upstream side of said water cooling piping, a purge gas flow passage which branches from said gas piping and is connected as a flow passage via a purge valve (V1) at a location downstream of said master valve (V0) so as to merge into said water cooling piping, and an intermediate valve (V2, V3) which is connected as a flow passage to said water cooling piping downstream of the merging point of said purge gas flow passage; said cooled structures are connected as a flow passage to said water cooling piping downstream of said intermediate valve (V2, V3); a valve control unit is provided, which performs interlocked opening/closing control of said master valve (V0), said purge valve (V1) and said intermediate valve (V2, V3); and said valve control unit, when said master valve (V0) is placed into a closed state and said purge valve (V1) is placed into an open state and Ar gas is fed via said purge gas flow passage, performs intermittent purge control whereby said intermediate valve (V2, V3) is intermittently opened and closed to repeat pressure accumulation and release of Ar gas upstream of said intermediate valve (V2, V3).

Effect of the Invention

According to the present invention, when draining of residual water of the cooling water system is to be performed for maintenance operations, etc., the valve control unit closes the master valve and places the purge valve into an open state to feed purge gas into the cooling water piping via the purge gas flow passage, at which time the valve control unit performs control whereby the intermediate valve is intermittently opened and closed.

As a result, intermittent purging is performed, whereby pressure accumulation and release of Ar gas are intermittently repeated upstream of the intermediate valve.

Therefore, it becomes possible to perform purging by intermittently flashing with Ar gas whereof the pressure has accumulated in the piping upstream of the intermediate valve (which is at about the same pressure level as the supply pressure upstream of the purge valve), making it possible to effectively drain residual water with a smaller quantity of Ar gas.

Furthermore, since there is no need to continuously (rather than intermittently) release Ar gas as in the prior art, the total consumption of Ar gas consumed during draining can also be reduced.

In the invention as described above, it is preferable to provide, in the purge gas flow passage downstream of the purge valve, a pipe resistance comprising a pipe of the same diameter as or narrower diameter than the pipe diameter of the purge gas flow passage.

As a result, even when the purge valve is placed into an open state, it is possible to suppress sudden inflow of Ar gas into the purge gas flow passage, so the fluctuation in the supply pressure upstream of the purge valve can be kept very low. It will be noted that in the case of the same diameter, pipe resistance can be increased by providing a longer flow passage length.

While the effect of reducing fluctuation in supply pressure here becomes greater with a greater pipe resistance, since the rate of inflow via the pipe resistance decreases, the pressure of inflowing gas downstream of the pipe resistance will drop. If purging is performed in a state of free discharge as in the prior art rather than performing intermittent purging, depending on the magnitude of the pipe resistance, the downstream gas pressure of the purge gas will drop, and if the flow resistance of cooling water is high, it will become impossible to drain residual water.

In response to this, in the present invention, by ensuring adequate time for accumulating pressure of Ar gas in accordance with the magnitude of pipe resistance in the flow passage up to the intermediate valve when the purge valve has been placed into an open state, the pressure of Ar gas accumulated upstream of the intermediate valve can be restored to about the same level as the pressure in the piping upstream of the purge valve, so even if the pipe resistance is increased, the operation of purging residual water can be effectively performed with the accumulated pressure.

Namely, not only can the fluctuation in supply pressure upstream of the pipe resistance be reduced, but residual water can be effectively drained with a smaller amount of Ar gas by performing purging by flushing with Ar gas whereof the pressure has accumulated upstream of the intermediate valve (to a pressure equal to the pressure inside the piping upstream of the purge valve).

Furthermore, in the present invention as described above, a configuration may be adopted wherein the water cooling piping of the cooling water system branches, downstream of the merging point of the purge gas flow passage, into a bypass flow passage having a first intermediate valve, and a high frequency power supply cooling flow passage to which a second intermediate valve and the high frequency power supply are connected as flow passages in series in that order; the sample introduction unit and the high frequency coil are connected as flow passages downstream of the bypass flow passage and the high frequency power supply cooling flow passage; and the valve control unit, when performing intermittent purge control, performs control whereby the first intermediate valve and the second intermediate valve are simultaneously placed into an open state, and the bypass flow passage and high frequency power supply cooling passage are simultaneously purged.

Furthermore, instead of this, a configuration may be adopted wherein the valve control unit, when performing intermittent purge control, performs control whereby the first intermediate valve and second intermediate valve are alternately placed into an open state one at a time, and the bypass flow passage and high frequency power supply cooling flow passage are purged one at a time.

In the ICP mass analysis device of the present invention, in order to prevent condensation on the high frequency power supply, the flow passage of the cooling water system is connected so as to branch into a bypass flow passage and high frequency power supply cooling passage, a first intermediate valve is arranged in the bypass flow passage, and a second intermediate valve and the high frequency power supply are arranged in the high frequency power supply cooling flow passage. This first intermediate valve and second intermediate valve are configured such that when the high frequency power supply is off, the first intermediate valve is opened and the second intermediate valve is closed, and when the high frequency power supply is on, the first intermediate valve is closed and the second intermediate valve is opened, so that only one of the flow passages is in an open state and has cooling water flowing through it, thereby preventing the occurrence of condensation.

In the present invention, the first intermediate valve and second intermediate valve that are used for switching the flow passage in interlocking fashion with the turning on and off of the high frequency power supply for the purpose of preventing condensation, are also utilized for pressure accumulation for the purpose of draining residual water.

Namely, independently of the primary opening/closing control that is interlocked with the operation of the high frequency power supply, when the valve control unit performs intermittent purge control, control is performed whereby the first intermediate valve and second intermediate valve are simultaneously placed into an open state, and the bypass flow passage and high frequency power supply cooling flow passage are simultaneously purged. Alternatively, when performing intermittent purge control, the valve control unit performs control whereby the first intermediate valve and second intermediate valve are alternately placed into an open state one at a time.

According to the present invention, effective draining becomes possible simply by adding an intermittent purge control flow (intermittent purging sequence) using the valve control unit.

BRIEF DESCRIPTION OF THE DRAWINGS

FIG. 1 A drawing illustrating the device configuration of an ICP mass analysis device according to the present invention.

FIG. 2 A drawing illustrating the piping system of the cooling water system and Ar gas supply system in FIG. 1.

FIG. 3 A drawing illustrating an example of operating flow of the present invention.

FIG. 4 A drawing illustrating an example of operating flow of the present invention.

FIG. 5 A drawing illustrating an example of operating flow for reference.

FIG. 6 A drawing illustrating the device configuration of a conventional ICP mass analysis device FIG. 7 A drawing illustrating the piping system of the cooling water system and Ar gas supply system in FIG. 6.

FIG. 8 A simplified cross-sectional view illustrating the sample introduction unit in an ICP mass analysis device.

FIG. 9 A drawing illustrating an example of the Ar gas supply system in an ICP mass analysis device.

MODES FOR EMBODYING THE INVENTION

Embodiments of the present invention will be described below using the drawings.

FIG. 1 is a drawing illustrating the device configuration of an ICP mass analysis device A according to the present invention, and FIG. 2 is a drawing illustrating the piping system of the cooling water system and Ar gas supply system 3 in the ICP mass analysis device A of FIG. 1. For constituent parts which are the same as in the conventional ICP mass analysis device 100 described in FIGS. 6 and 7, the same reference symbols will be assigned and a portion of the description will be thus omitted.

In the ICP mass analysis device A according to the present invention, the device main body control unit 16 composed of a computer device as in the conventional ICP mass analysis device 100, is provided with a valve control unit 35 which performs execution of a valve control program which implements Ar gas purging based on opening and closing of a master valve V0, purge valve V1, first intermediate valve V2 and second intermediate valve V3.

This valve control unit 35, when draining of the cooling water system 2 is to be performed, as a maintenance mode, performs intermittent purge control in which the master valve V0, purge valve V1, first intermediate valve V2 and second intermediate valve V3 are operated according to an operation flow as described below. Namely, when master valve V0 is placed into a closed state and purge valve V1 is placed into an open state and Ar gas is fed into the cooling water system 2 via the purge gas flow passage 32, the first intermediate valve V2 and second intermediate valve V3 are maintained in a closed state until the time necessary for pressure accumulation (pressure accumulation time T) has elapsed and are then placed into an open state, after which they are again placed into a closed state, which is maintained until pressure accumulation time T has elapsed, after which the valves are placed into an open state. The operation of opening and closing intermittently in this manner is repeated to perform control for repeating the pressure accumulation and release of Ar gas.

Furthermore, in the present embodiment, a pipe resistance 36 which restricts inflow of gas is provided in the purge gas flow passage 32 downstream of the purge valve V1. The pipe resistance 36 is selected to have a magnitude of resistance sufficient to prevent sudden pressure fluctuation upstream of the purge valve V1 when the purge valve V1 is opened.

Specifically, in the middle of the purge gas flow passage 32 formed from gas pipe with an inside diameter of 4 mm, a pipe with a narrower inside diameter of 0.5 mm is connected as a (coiled) pipe resistance 36 with a length of 1 m, thereby increasing the pipe resistance of the purge gas flow passage 32.

Connecting the pipe resistance 36 causes the gas flow rate downstream of the pipe resistance 36 to decrease, so the time required for pressure accumulation in the intermittent purge control described above (pressure accumulation time T), i.e. the waiting time until the accumulated Ar gas pressure becomes about the same as the pressure upstream of the purge valve V1, is preset in accordance with the magnitude of the pipe resistance 36 on the basis of preliminary experiments. Furthermore, the time during which the intermediate valves V2, V3 are opened (opening time F) is also set in advance. The description here will assume that the pressure accumulation time T has been set at 10 seconds and the opening time F has been set at 5 seconds.

Furthermore, the purge count n (used as the argument n in the operation flow described later) is also set in advance. In the following embodiment example, it will be assumed that this was set so as to perform five purges (n=5).

Next, the gas purge operation flow under the aforesaid conditions will be described.

(Operation Flow-1)

FIG. 3 is a flow chart explaining an example of the gas purging operation flow using the valve control unit 35 of the ICP mass analysis device A.

When an input operation is performed to start maintenance mode with the input device of the device main body control unit 16 in order to perform draining of the cooling water system 2, the parameter n which counts the number of purges is set to the initial value 0, the master valve V0 closes, and the first intermediate valve V2 and second intermediate valve V3 are closed nearly simultaneously. It will be noted that the purge valve V1 is closed to begin with (ST101).

Next, the purge valve V1 is opened and the open state is maintained until a preset pressure accumulation time T (10 seconds) elapses. As a result, the Ar gas of the purge gas flow passage 32 is accumulated until its pressure reaches the same level as the pressure upstream of the purge valve V1 (ST102). The first time, since cooling water remains downstream of the check valve GV, by way of exception, Ar gas is accumulated in the pipe only up to the check valve GV, but in the second and subsequent pressure accumulation described below, pressure accumulation occurs also downstream of the check valve GV.

Next, the first intermediate valve V2 and second intermediate valve V3 are opened for a preset opening time F (5 seconds) to perform purging. During this time, the purge valve V1 is maintained in an open state, and Ar gas which has accumulated in the purge gas flow passage 32 is released and flows downstream, draining the residual water in the downstream direction.

At this time, 1 is added to the purge count parameter n (ST103).

Next, the current purge count is checked on the basis of the parameter n (ST104). If the purge count parameter n is less than 5, the processing of ST102 through ST104 is repeated.

Once parameter n becomes 5, control proceeds to ST105.

After confirming that the set number (n=5) of purges has been carried out in ST104, the master valve V0 and purge valve V1 are closed (ST105). Purging is thereby ended.

The first intermediate valve V2 and second intermediate valve V3 are then also closed (ST106). Device operation is thereby completed.

According to the above procedure, draining can be efficiently carried out through gas purging while reducing the consumption of Ar gas.

(Operation Flow-2)

FIG. 4 is a flow chart explaining another example of the gas purge operation flow using the valve control unit 35 of the ICP mass analysis device A. The difference from "operation flow-1" described above is that the first intermediate valve V2 and second intermediate valve V3 are alternately opened and closed in order to carefully purge flow passage (bypass flow passage) 23 and flow passage (high frequency power supply cooling flow passage) 24 one by one. The operation in this case is as follows.

When an input operation to start maintenance mode is performed using the input device of the device main body control unit 16, the parameter n which counts the number of purges is set to the initial value 0, the master valve V0 closes, and the first intermediate valve V2 and second intermediate valve V3 are closed nearly simultaneously. It will be noted that the purge valve V1 is closed to begin with (ST201).

Next, the purge valve V1 is opened and the open state is maintained until a preset pressure accumulation time T (10 seconds) elapses. As a result, the Ar gas of the purge gas flow passage 32 is accumulated until its pressure reaches the same level as the pressure upstream of the purge valve V1 (ST202). The first time, since cooling water remains downstream of the check valve GV, by way of exception, Ar gas is accumulated in the pipe only up to the check valve GV, but in the second and subsequent pressure accumulation described below, pressure accumulation occurs also downstream of the check valve GV.

Next, the first intermediate valve V2 is opened for a preset opening time F (5 seconds) to perform purging. During this time, the purge valve V1 is maintained in an open state, while the master valve V0 and second intermediate valve V3 are maintained in a closed state. As a result, the Ar gas which has accumulated in the purge gas flow passage 32 is released and flows downstream, draining the residual water in the downstream direction. At this time, 1 is added to the purge count parameter n (ST203).

Next, with the purge valve V1 remaining open, the first intermediate valve V2 is closed, and the open state is maintained until a preset pressure accumulation time T (10 seconds) elapses. As a result, the Ar gas of the purge gas flow passage 32 is accumulated until its pressure reaches the same level as the pressure upstream of the purge valve V1 (ST204).

Next, the second intermediate valve V3 is opened for a preset opening time F (5 seconds) and purging is performed. During this time, the purge valve V1 is maintained in an open state, while the master valve V0 and first intermediate valve V2 are maintained in a closed state. As a result, the Ar gas which has accumulated in the purge gas flow passage 32 is released and flows downstream, draining the residual water in the downstream direction. The purge count parameter n remains unchanged at this time (ST205).

Next, the current purge count is checked on the basis of the parameter n (ST206). If the purge count parameter n is less than 5, the processing of ST202 through ST205 is repeated.

Once parameter n becomes 5, control proceeds to ST207.

After confirming that the set number (n=5) of purges has been carried out in ST206, the master valve V0 and purge valve V1 are closed (ST207). Purging is thereby ended.

The first intermediate valve V2 and second intermediate valve V3 are then also closed (ST208). Device operation is thereby completed.

According to the above procedure, draining can be efficiently carried out through gas purging while reducing the consumption of Ar gas.

(Reference Operation Flow)

Two operation flows constituting embodiments of the present invention were described above. The above-described operation flows-1 and 2 make it possible to achieve a reduction in Ar gas consumption and a reduction in supply pressure fluctuation of the Ar gas supply system, which are the two object of the present invention.

By contrast, when the object is only the latter—reduction in supply gas fluctuation, if the flow resistance of cooling water flowing through the water cooling piping is low and draining is possible with the pressure of the purge gas which has passed through the pipe resistance 36, the device configuration can be simplified.

Namely, it is possible to reduce supply pressure fluctuation simply by using the pipe resistance 36 of the purge gas flow passage 32, without performing intermittent purge control. The reference operation flow for this case is shown in FIG. 5.

When an input operation is performed to start maintenance mode with the input device of the device main body control unit 16, the master valve V0 closes, and the first intermediate valve V2 and the second intermediate valve V3 are closed nearly simultaneously. It will be noted that the purge valve V1 is closed to begin with (ST301).

Next, the purge valve V1, first intermediate valve V2 and second intermediate valve V3 are opened simultaneously, and the open state is maintained until a preset opening time F (for example, 30 seconds) elapses (ST302). The master valve V0 is maintained in a closed state. At this time, Ar gas flows in continuously, but the inflow of gas is restricted due to the existence of the pipe resistance 36, so the supply pressure does not drop significantly, making it possible to prevent adverse effects due to pressure fluctuation upstream of the purge valve V1.

Next, after the opening time has elapsed, the master valve V0, purge valve V1, first intermediate valve V2 and second intermediate valve V3 all close, whereby operation of the device is completed (ST303).

Embodiments of the present invention have been described above, but the present invention is not limited to these embodiments and of course includes various other configurations that do not depart from the gist of the present invention.

For example, in the embodiments described above, a structure involving switching the first intermediate valve V2 of flow passage (bypass flow passage) 23 and the second intermediate valve V3 of flow passage (high frequency power supply cooling flow passage) 24 was employed, but the invention can also be applied with a cooling water system of a simpler structure in which no bypass flow passage is provided and only a single intermediate valve is arranged in a single flow passage.

Furthermore, in the embodiments described above, a pipe resistance 36 was provided in the purge gas flow passage 32 to reduce pressure fluctuation on the upstream side, but if instead no pipe resistance 36 is provided and only intermittent purge control is performed using the valve control unit 35, intermittent pressure fluctuation of upstream supply pressure will occur, but this is still effective because the magnitude of supply pressure fluctuation can be reduced as compared to the free-flowing state of the prior art.

FIELD OF INDUSTRIAL APPLICATION

The present invention can be employed for ICP mass analysis devices.

DESCRIPTION OF REFERENCE SYMBOLS

A ICP mass analysis device
1 Device main body unit
2 Cooling water system
3 Ar gas supply system
11 Plasma torch
12 High frequency power supply
13 Sample introduction unit
14 Mass analysis unit (mass analyzer)
15 Gas flow rate control unit
16 Device main body control unit
18 High frequency coil
19 Nebulizer
20 Chiller (water source)
23 Bypass flow passage
24 High frequency power supply cooling flow passage
26 Sample introduction unit cooling flow passage
27 High frequency coil cooling flow passage
32 Purge gas flow passage

The invention claimed is:

1. An ICP mass analysis device characterized in that it comprises:

a device main body unit which supplies Ar gas for plasma generation and sample gas, via a gas flow rate control unit which controls gas flow rate, to a reaction tube of a plasma torch, ionizes the sample gas by applying a high frequency voltage from a high frequency power supply to a high frequency coil of said plasma torch, and draws in generated sample ions through a sample introduction unit to a mass analyzer to perform mass analysis;

a cooling water system in which water cooling piping is connected as a flow passage to cooled structures which require cooling, including said high frequency power supply, said high frequency coil and said sample introduction unit, and which supplies cooling water from a water source to said cooled structures; and an Ar gas supply system in which gas piping is connected as a flow passage to said gas flow rate control unit and which supplies Ar gas from an Ar gas source;

wherein, in said cooling water system, there is provided a master valve which is connected as a flow passage on the upstream side of said water cooling piping, a purge gas flow passage which branches from said gas piping and is connected as a flow passage via a purge valve at a location downstream of said master valve so as to merge into said water cooling piping, and an intermediate valve which is connected as a flow passage to said water cooling piping downstream of the merging point of said purge gas flow passage;

said cooled structures are connected as a flow passage to said water cooling piping downstream of said intermediate valve;

a valve control unit is provided, which performs interlocked opening/closing control of said master valve, said purge valve and said intermediate valve; and said valve control unit, when said master valve is placed into a closed state and said purge valve is placed into an open state and Ar gas is fed via the purge gas flow passage, performs intermittent purge control whereby said intermediate valve is intermittently opened and closed to repeat pressure accumulation and release of Ar gas upstream of said intermediate valve.

2. An ICP mass analysis device as set forth in claim 1, characterized in that, in the purge gas flow passage downstream of said purge valve, there is provided a pipe resistance comprising a pipe of the same diameter as or narrower diameter than the pipe diameter of the purge gas flow passage.

3. An ICP mass analysis device as set forth in claim 1, characterized in that the water cooling piping of said cooling water system branches, downstream of the merging point of said purge gas flow passage, into a bypass flow passage having a first intermediate valve, and a high frequency power supply cooling flow passage to which a second intermediate valve and said high frequency power supply are connected as flow passages in series in that order;

said sample introduction unit and said high frequency coil are connected as flow passages downstream of said bypass flow passage and said high frequency power supply cooling flow passage; and said valve control unit, when performing said intermittent purge control, performs control whereby said first intermediate valve and said second intermediate valve are simultaneously placed into an open state, and said bypass flow passage and said high frequency power supply cooling passage are simultaneously purged.

4. An ICP mass analysis device as set forth in claim 1, characterized in that the water cooling piping of said cooling water system branches, downstream of the merging point of said purge gas flow passage, into a bypass flow passage having first intermediate valve, and a high frequency power supply cooling flow passage to which a second intermediate valve and said high frequency power supply are connected as flow passages in series in that order;

said sample introduction unit and said high frequency coil are connected as flow passages downstream of said bypass flow passage and said high frequency power supply cooling flow passage; and said valve control unit, when performing said intermittent purge control, performs control whereby said first intermediate valve and said second intermediate valve are alternately placed into an open state one at a time, and said bypass flow passage and said high frequency power supply cooling flow passage are purged one at a time.

* * * * *